(12) United States Patent
Dror et al.

(10) Patent No.: US 12,659,072 B2
(45) Date of Patent: Jun. 16, 2026

(54) CELLULAR NETWORKS FEC OFFLOAD

(71) Applicant: Parallel Wireless, Inc., Nashua, NH (US)

(72) Inventors: Efi Dror, Kadima-Zoran (IL); Christopher Smart, Wiltshire (GB); Steven Paul Papa, Windham, NH (US); Ofir Ben Ari Katzav, Kadima-Zoran (IL)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/186,947

(22) Filed: Mar. 20, 2023

(65) Prior Publication Data

US 2023/0299875 A1     Sep. 21, 2023

Related U.S. Application Data

(60) Provisional application No. 63/321,141, filed on Mar. 18, 2022.

(51) Int. Cl.
H04L 1/00 (2006.01)
H04L 5/00 (2006.01)

(52) U.S. Cl.
CPC ............ H04L 1/004 (2013.01); H04L 5/0044 (2013.01)

(58) Field of Classification Search
CPC .............................. H04L 1/004; H04L 5/0044
USPC ........................................................ 714/726
See application file for complete search history.

(56) References Cited

U.S. PATENT DOCUMENTS

| | | | | |
|---|---|---|---|---|
| 8,839,078 | B2 * | 9/2014 | Abu-Surra ............ | H04L 1/0057 |
| | | | | 714/776 |
| 10,084,567 | B2 * | 9/2018 | Lee ....................... | H04L 1/0009 |
| 11,191,049 | B1 * | 11/2021 | Chandrasekher ... | H04W 56/001 |
| 2002/0013135 | A1 * | 1/2002 | Proctor, Jr. ............ | H04L 69/22 |
| | | | | 455/228 |
| 2010/0299713 | A1 * | 11/2010 | Salinger ................. | H04N 7/104 |
| | | | | 439/578 |
| 2014/0101306 | A1 | 4/2014 | Murgia | |
| 2014/0146758 | A1 * | 5/2014 | Lovell ................... | H04L 1/0041 |
| | | | | 370/329 |
| 2014/0258813 | A1 | 9/2014 | Lusted et al. | |
| 2014/0307734 | A1 * | 10/2014 | Luby ....................... | H04L 67/06 |
| | | | | 370/390 |
| 2016/0100331 | A1 | 4/2016 | Ahmavaara | |
| 2016/0255580 | A1 | 9/2016 | Onaka et al. | |
| 2018/0076930 | A1 * | 3/2018 | Buchali ............. | H04B 10/5161 |
| 2018/0097582 | A1 * | 4/2018 | Buchali ................. | H04B 10/29 |
| 2019/0306282 | A1 | 10/2019 | Masputra et al. | |
| 2020/0195342 | A1 * | 6/2020 | Rapaport ............ | H04B 10/116 |
| 2020/0280428 | A1 * | 9/2020 | Kovacs ................. | H04L 5/1438 |

(Continued)

*Primary Examiner* — James C Kerveros
(74) *Attorney, Agent, or Firm* — Michael Y. Saji

(57) ABSTRACT

The disclosed invention presents new approach for FEC implementation as part of existing link between the PHY layer (L1) and MAC layer. In one embodiment a method for providing cellular network Forward Error Correction (FEC) offload, includes merging FEC functionality into the PHY-MAC interface including placing FEC functionality IPs inside a small form factor (SFP) transceiver and allowing configurations from the PHY controller; identifying data carrying packets; encoding/decoding of the data payload; and forwarding an encoded/decoded payload to the next layer.

23 Claims, 6 Drawing Sheets

(56)                    References Cited

U.S. PATENT DOCUMENTS

| | | | |
|---|---|---|---|
| 2020/0404069 | A1 | 12/2020 | Li et al. |
| 2021/0243247 | A1 | 8/2021 | He et al. |
| 2022/0210250 | A1* | 6/2022 | Chandrasekher ....... H04L 69/22 |

* cited by examiner

600

CELLULAR NETWORKS FEC OFFLOAD

CROSS-REFERENCE TO RELATED APPLICATIONS

The present application claims priority under 37 C.F.R. § 119(e) to U.S. Provisional Patent Application No. 63/321,141, entitled "Cellular Networks FEC Offload" and filed Mar. 18, 2022, hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

In wireless communication systems (and for wired ones) there is a vast use in FEC (Forward Error Correction) blocks to increase communication reliability and provide robustness for link distortion. Common approaches are convolution codes, turbo codes and low-density parity check codes (LDPC codes) which are widely used for cellular networks. In some communication systems, there is a dedicated FEC scheme per transmission/data type to best fit the receiver characteristics such as modulation type and code rate. FEC implementation is considered as compute intensive operation in terms of compute power and processing time. Traditional approach defined dedicated IPs, usually implemented in FPGA or ASIC to balance the performance gain and the implementation loses (e.g. compute power).

SUMMARY

The disclosed invention presents new approach for FEC implementation as part of existing link between the PHY layer (L1) and MAC layer. Hence, proposing novel solution to gain the benefits of HW acceleration within already used hardware (HW) without additional dedicated HW based accelerations to be added to the CU nor to the DU. Although in our approach, the FEC functionality will be offloaded to HW implementation, it's keeping the flexibility and scalability properties just because of the placement of it in the system (see description below). In addition, such an approach allows to reduce the required bandwidth (BW) between the PHY controller and the HW accelerator due to the fact the payload data doesn't have to traverse between the communication module (+) and the PHY, thus reducing the number of interfaces required for the PHY controller, their bandwidth and the latency.

In one embodiment a method for providing cellular network Forward Error Correction (FEC) offload, includes merging FEC functionality into the PHY-MAC interface including placing FEC functionality IPs inside a small form factor (SFP) transceiver and allowing configurations from the PHY controller; identifying data carrying packets; encoding/decoding of the data payload; and forwarding an encoded/decoded payload to the next layer.

DETAILED DESCRIPTION

Figure 1:
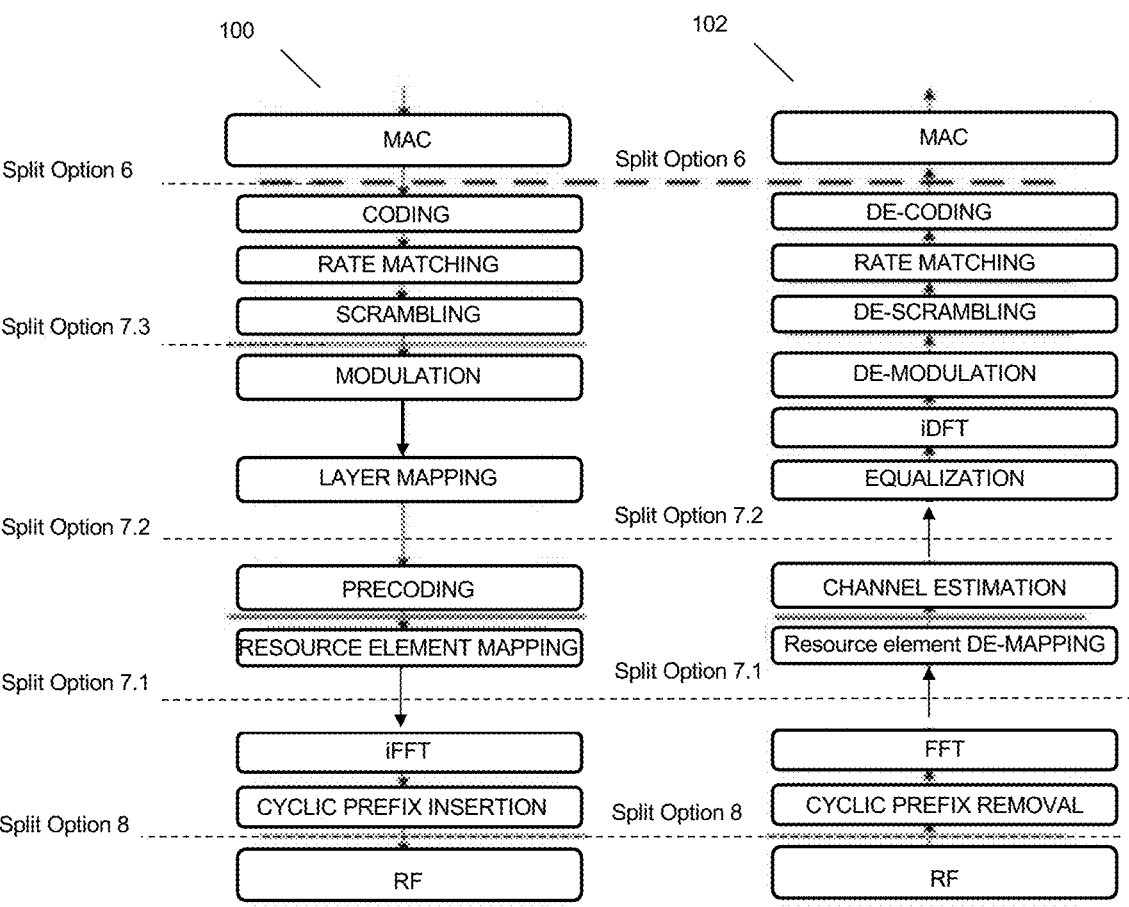
FIG. 1 is a schematic diagram of a 3GPP functional split architecture, in accordance with some embodiments.

In fully virtualized RAN approach with no HW acceleration, implementation of FEC is a big burden for the compute platform running the solution. One approach to tackle that drawback is to keep the FECs on HW acceleration platform (dedicated ASIC or FPGA) which is combined into the compute platform. In some cases, the latter is a reasonable solution although an expensive one when considering large scale of the RAN solution. An alternative approach of implementing the virtual RAN partially and keeping the PHY functionality (and the FEC) in dedicated HW platform with suitable HW accelerators also stands in contradiction to other concepts of the virtualized RAN and prevent, or reduce, flexibility, scalability and future proofing. In addition, this approach suffers from additional penalty of the latency incurred by the large data required to offload and the excessive bandwidth it requires.

The literature includes various different approaches to shorten the cycles invested in FEC. One trivial example is early termination. Although multiple methods were developed to shrink down the FEC processing time, none of them propose our approach. There are a few examples for FEC optimization approaches, including distributed approaches where the RRH initiates retransmission without involving the DU/CU.

Some propose a mechanism for decoder early termination based on code word decoding convergence with somewhat predictive approach for how many iterations to allocate to next code word. This approach is much different from this proposal since we mainly focus on tuning the decoder iterations based on compute complexity and network level considerations.

Others talk about centralized management of decoders but doesn't consider compute complexity aspects.

There are proposals for decoder optimization by assessment of the link quality to determine if re-transmission is required in the distributed units (RRHs) instead of providing the data to the centralized processing core. It differs from our approach completely by network architecture and the optimization goal.

Others consider early termination of iterative decoding with adjustable method to determine the max iteration for next code word, including channel quality indication—it defers from our approach in the optimization target.

Some propose reduced latency for the decoder by changing the data and parity bits in such manner to have more efficient decoding—this will require standard change and hence less relevant in our case.

The baseline of the disclosed invention is implementation of the FEC part for both downlink and uplink with suitable controls and aiding components as part of the link between PHY and MAC instead on the compute platform running the PHY process.

There are two benefits of such approach: 1.FEC offloaded from the PHY compute platform to HW acceleration on existing HW component instead of add-on one. FEC HW acceleration is well known approach and usually done with ASIC or FPGA. Offloaded FEC functionality into already existing component in the cellular network is contemplated by the inventors. In cellular networks as in others, MAC and PHY interface can be implemented with optical link, the optical link includes SFP (or equivalent) on either end of the link. We propose to implement the FEC acceleration inside the SFP or equivalent module, i.e., in an interlink. Such modules are replaceable and exchangeable and thus allowing easy flexibility and like soldered down ASIC.

Implementation of the FEC offload as part of the communication link between the MAC and PHY offers another advantage of not having to propagate the data from, e.g., MAC to PHY, and then from the PHY to the HW acceleration for encoding and back to the PHY (example for downlink, similar in uplink). Our approach suggests removing the parts of data forwarding to the FEC and then back to the PHY. Instead, the data encoding/decoding is done as part of the communication link/protocol between the PHY and MAC. Such mechanism reduces dramatically the HW acceleration interface requirements and latency which can be much more challenging in communication systems with higher data rate (e.g. 5G-NR).

We consider a system where the PHY processing and the MAC (and above) processing is done in two different physical or logical compute platforms in which a dedicated communication link exists between the two components. Commonly known as option 6 split in LTE and 5G but can be designed similarly where the RAN components are hosted on data center like platform with interconnects (also commonly done with fiber optic as well). This can be done for different RATs as well as LTE and 5G, in some embodiments.

FIG. 1 shows a 3GPP functional Logical split architecture. FIG. 1 illustrates an LTE communication system, with the downlink (DL) shown as 100 and the uplink (UL) shown as 102. Functional split Options 6, 7.1, 7.2, 7.3, and 8 are shown as lines of demarcation on the figure for both UL and DL.

To better describe our invention, we shall reshape the above and consider split option 6 architecture as follows.

Figure 2:
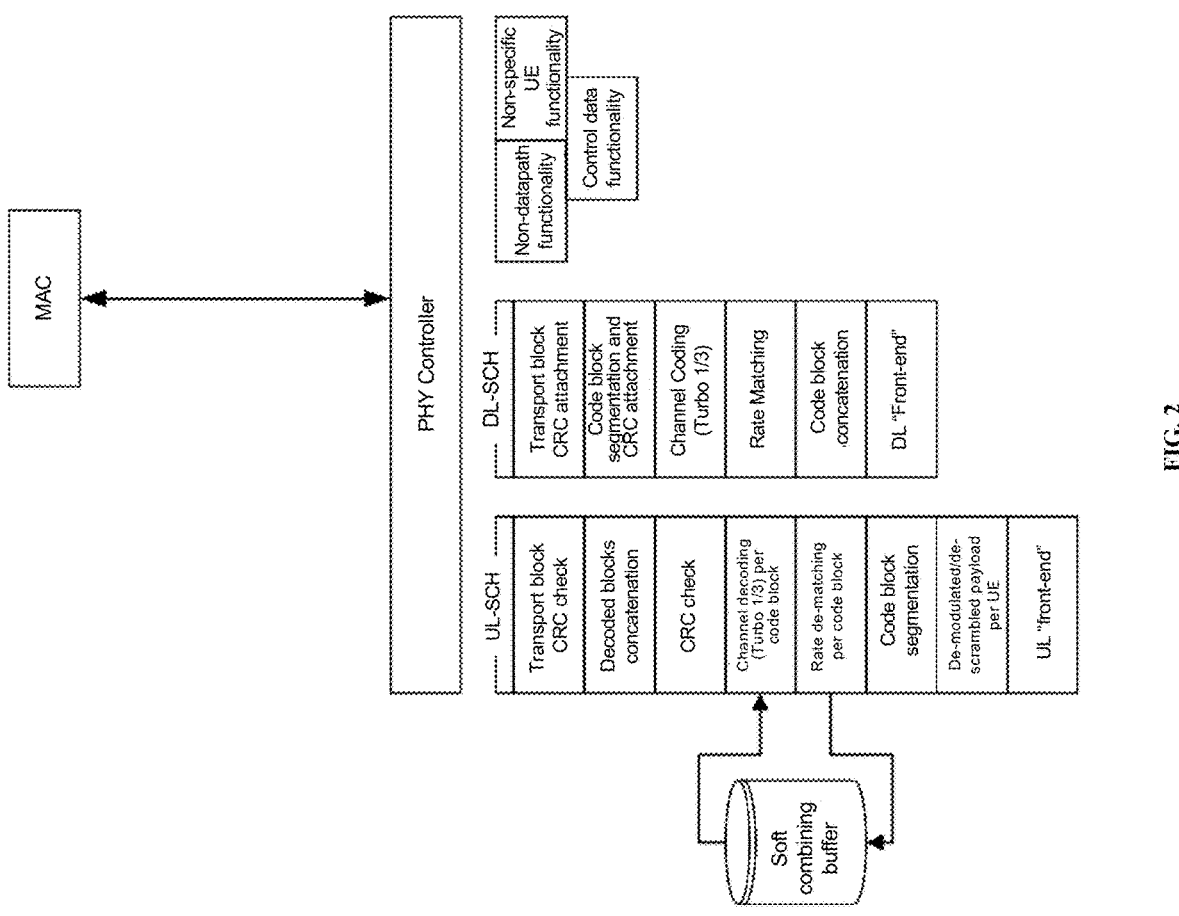
FIG. 2 is a schematic diagram of an architecture block diagram showing forward error correction (FEC) and non-FEC components, in accordance with some embodiments.

FIG. 2 presents the architecture classification for FEC related and non-FEC related, in some embodiments both controlled by PHY controller (or equivalent). This figure also elaborates on the FEC functionality and encapsulates all other functionalities (e.g. modulation, channel estimation, etc.) into "front-end" block. Although FIG. 2 describes in detail an LTE system, a similar or identical approach is applicable for 5G or for other RATs, such as 2G/3G, and can be adapted to any kind of RAN as well as other wired and wireless communication systems. The FEC components are shown on the left for both the uplink shared channel (UL-SCH) and downlink shared channel (DL-SCH), and the non-FEC components are shown on the right as non-data path functionality, non-specific UE functionality, and control data functionality.

The invention describes an approach of merging the FEC functionality into the PHY-MAC interface. In simplified view, it means to put the FEC functionality inside the small form factor pluggable (SFP) (or equivalent) module and allow (1) configurations from the PHY controller, (2) identification of data carrying packets, (3) encoding/decoding of the data payload and (4) forwarding the encoded/decoded payload to the next layer. In addition, we consider having the combining buffer for retransmissions as part of this FEC offload method. The latter is designed to remove any need to implement the combining part along with part of the blocks in the PHY compute platform. Thus, providing full offload for the FEC operation.

Figure 3:
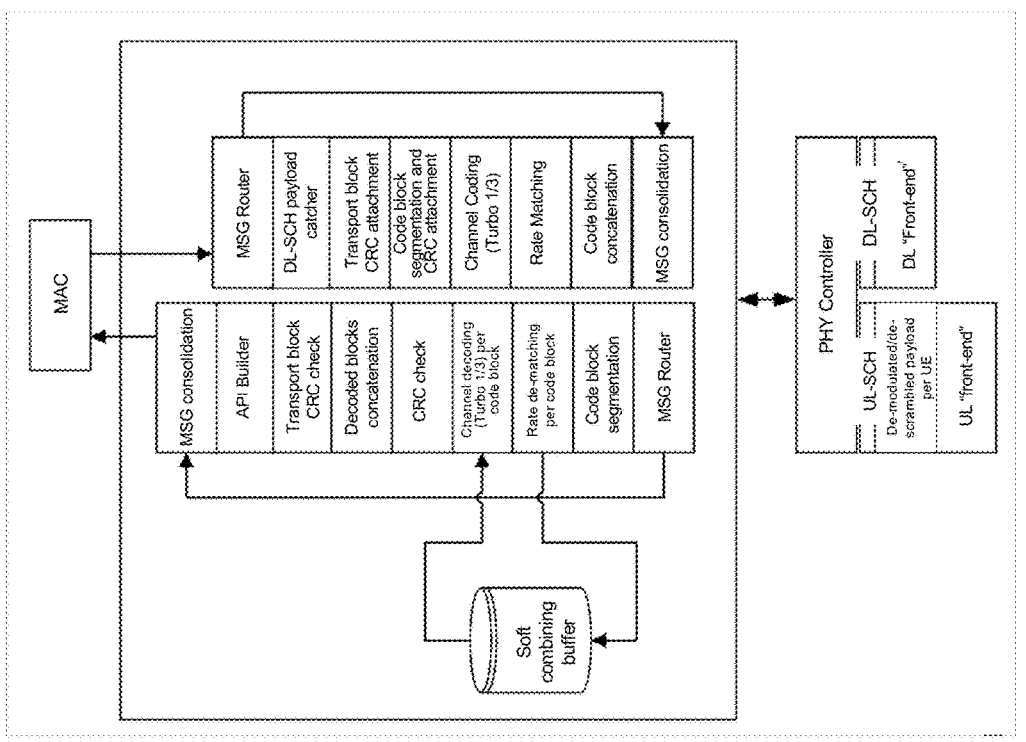
FIG. 3 is a schematic diagram of a block diagram of a MAC-PHY interlink containing FEC functionality, in accordance with some embodiments.

FIG. 3 shows a block diagram of a MAC-PHY interlink containing FEC functionality, in accordance with some embodiments.

The big box in the middle is assumed to be ASIC or part of ASIC implemented as part of the PHY-MAC interface E.g. the SFP. This box will be named FEC offload component. It's physically connected on one side to the MAC and on the other side to the PHY.

The Downlink Path:

The FEC offload component identifies data payload carrying messages based on coordinated protocol or any other means of "teaching" it to identify the payload messages.

In some embodiments-FEC offload component independently identify data payloads based on pattern, preamble, header or equivalent.

In some embodiments-FEC offload identification can be based on predefined protocol (e.g. part of O-RAN or nFAPI standards) or by proprietary approach (e.g. reading message type per the defined protocol).

FEC offload component doesn't propagate the data payload to the PHY at this stage but only all other messages.

In some embodiments-data payload is propagating in a pipeline manner and not bouncing between the MAC to PHY and then to the FEC offload component.

In some embodiments-propagating the data payload from the MAC to the PHY and then to the FEC offload component can be done on expense of increased links traffic.

FEC configurations are either extracted by the FEC offload component independently or being provided by the PHY controller.

In some embodiments independent configuration identification by prior knowledge/programming of the link protocol and/or following standard definition.

In some embodiments-all non-data payloads propagate to the PHY controller and in turn, the PHY controller configure the FEC offload component for the next or current data payload.

In some embodiments-when PHY controller provides the FEC configurations, it can set the configuration blindly in advance for the next data payload or by using dedicated identification marking of the data payload.

FEC offload component encodes the data payload based on the communication system definition (e.g. LDPC in 5G).

In some embodiments-FEC offload component holds dedicated FEC functionality for turbo coding in LTE (including all related blocks of CRC/segmentation/concatenation/rate matching and such).

In some embodiments-FEC offload component holds dedicated encoding capabilities for turbo coding in 3G.

In some embodiments-FEC offload component holds dedicated encoding capabilities for LDPC in 5G (including all related blocks of CRC/segmentation/concatenation/rate matching and such).

In some embodiments-multiple and configurable encoding possibilities for multiple communication support in the same solution.

FEC offload component generate a message to the PHY controller with the encoded data, as well as any kind of encoded bit arrangement, with proper header and send it to the PHY controller.

In some embodiments-FEC offload sends the encoded data with the dedicated message header to the PHY controller. Hence, PHY controller shall be adjusted to decode such messages.

In some embodiments-FEC offload component encapsulate the encoded data with the same header as provided from the MAC layer.

In some embodiments-FEC offload encapsulate the encoded data on known protocol (e.g. ORAN, nFAPI) with dedicated marking in the user defined fields.

PHY layer process the encoded data as if it came from internal encoder implementation.

In some embodiments PHY layer bypassing the FEC functionality when using the FEC offload component.

In some embodiments PHY controller can choose to bypass one or more of the functionalities in the FEC offload component and apply this functionality to the data on the PHY compute platform.

The Uplink Path:

PHY layer receive the data payload from the counter part of the communication link and process it up to the FEC input (e.g. impairment corrections, demodulation, etc.)

PHY controller encapsulate the demodulated data into a message for the FEC offload component In some embodiments data for decoding encapsulation done with proprietary header or standard header or by using user fields in existing protocol.

In some embodiments-PHY controller provides decoding configurations to the FEC offload component before delivering the data payload In some embodiments-PHY controller provides decoding configurations to the FEC offload component in the same message with the data payload.

FEC offload component decode the data according to the communication standard.

In some embodiments-FEC offload component holds dedicated decoding capabilities for turbo decoding in LTE (including all related blocks of deCRC/desegmentation/deconcatenation/derate matching and such).

In some embodiments-FEC offload component holds dedicated decoding capabilities for turbo coding in 3G.

In some embodiments-FEC offload component holds dedicated decoding capabilities for LDPC in 5G (including all related blocks of deCRC/desegmentation/deconcatenation/derate matching and such).

In some embodiments-multiple and configurable decoding possibilities for multiple communication support in the same solution.

In case the communication standard defines retransmission combining the FEC offload component will do the combining based on the PHY controller commands.

In some embodiments-FEC offload component holds internal or external memory for the retransmission combining.

In some embodiments-memory allocated for combining optimized to fit retransmission percentage (e.g. HARQ retransmissions) instead of full memory for max retransmission for all data payloads.

FEC offload component will perform CRC check.

In some embodiments-CRC report reported back to the PHY controller.

In some embodiments-upon CRC check pass, FEC offload will autonomously clear the relevant allocation in the combining buffer.

FEC offload component build the message with the decoded data and/or with the CRC check result to the MAC layer.

In some embodiments-message to the MAC can use proprietary protocol, or standard protocol, or populate user fields in standard protocol.

Other Aspects

In some embodiments-PHY messages to MAC layer that doesn't contain data payload will propagate to the MAC directly without FEC offload intervention except of routing and forwarding functionality.

In some embodiments-PHY controller can bypass one or more functionalities in the FEC offload and apply this functionality on PHY compute platform In some embodiments-PHY can hold a copy of the data payload previously forwarded to the FEC offload component and upon CRC check fail, do the retransmission combining on the PHY layer and then propagate the combined version of the payload to the FEC offload component.

Figure 4:
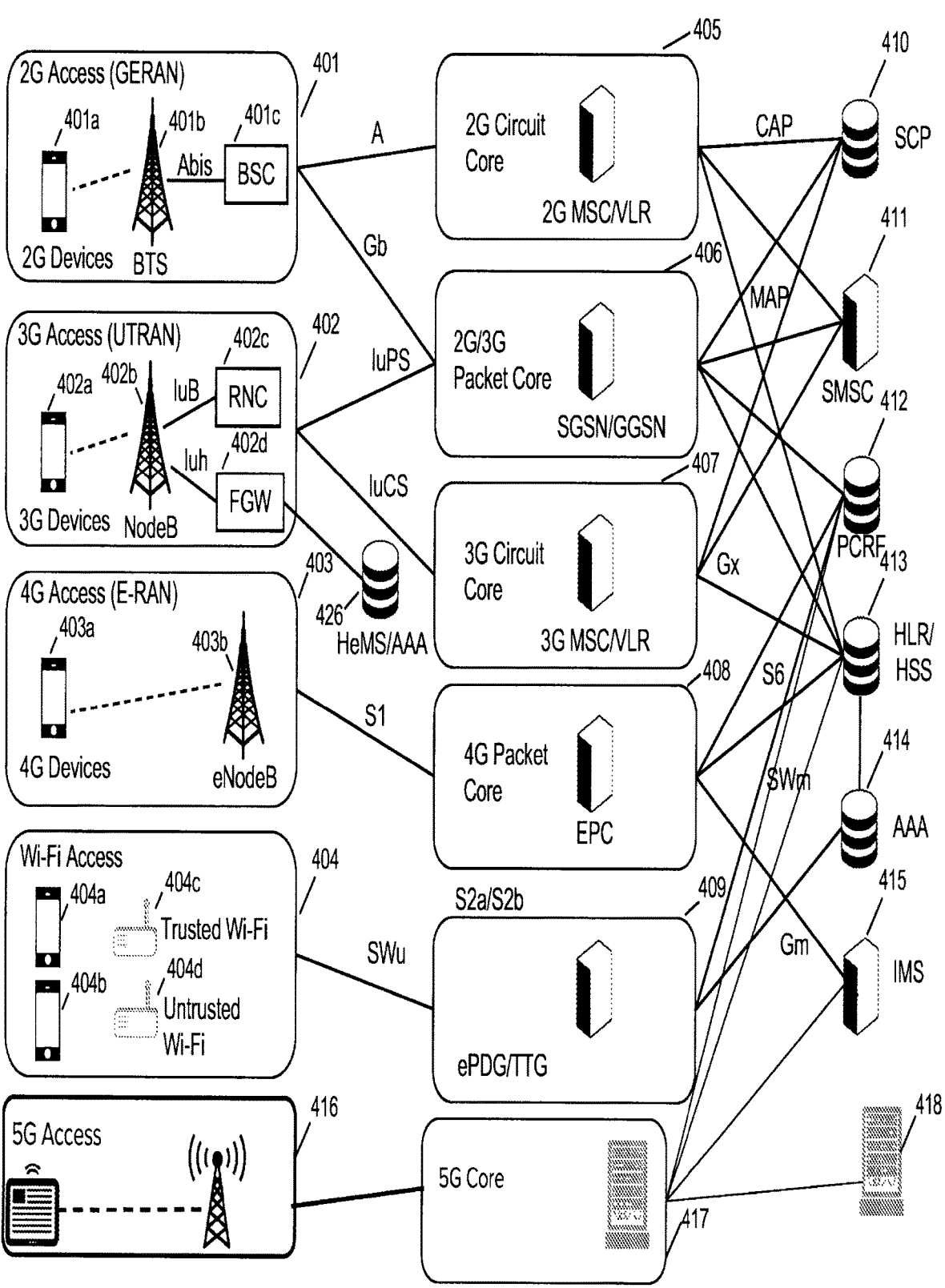
FIG. 4 is a schematic network architecture diagram for 3G and other-G prior art networks, in accordance with some embodiments.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
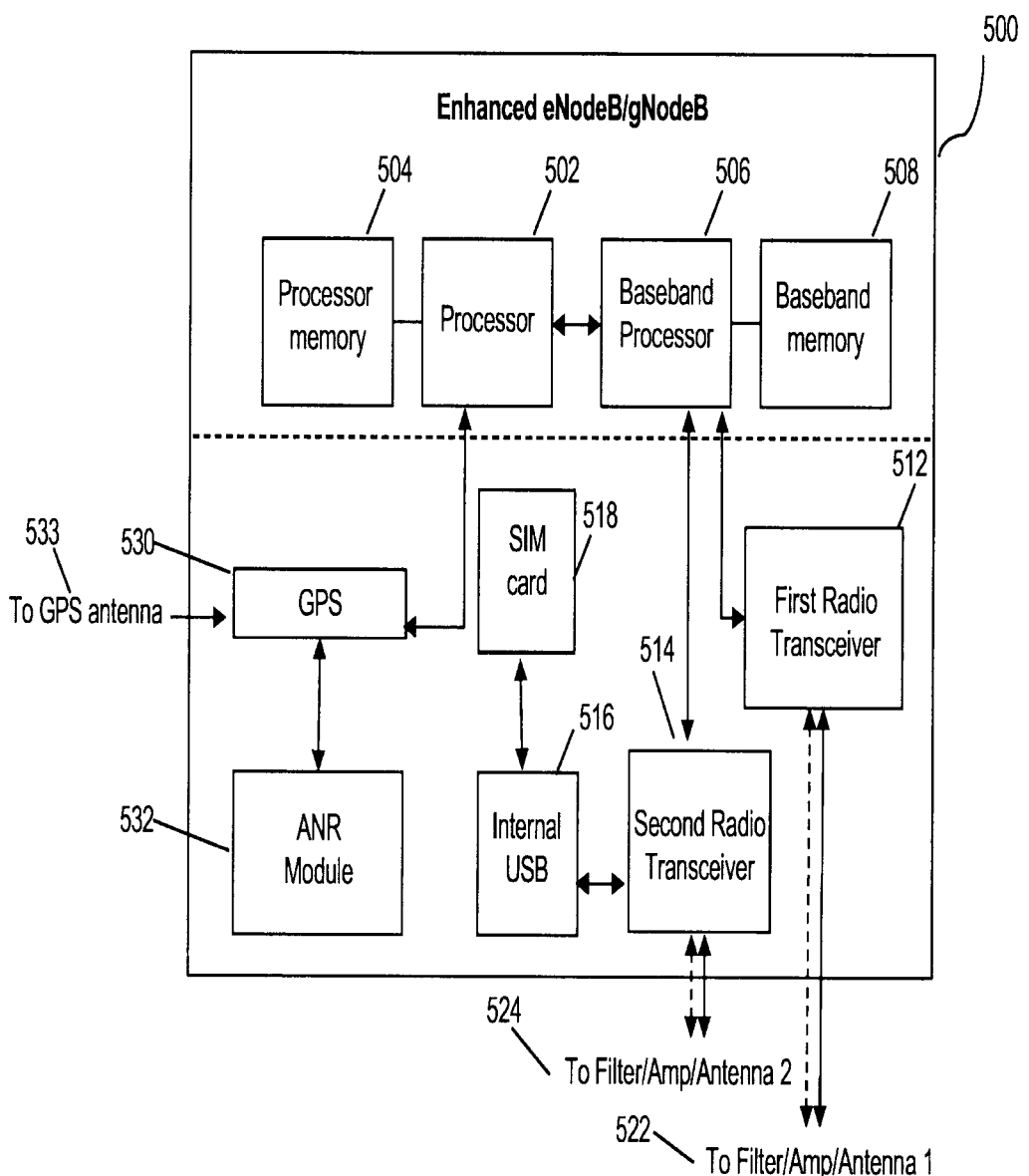
FIG. 5 is an enhanced eNodeB for performing the methods described herein, in accordance with some embodiments.

FIG. 5 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards. In alternative embodiments, baseband processor 506 may perform the functions described herein regarding FEC offload.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524. The link or coupling between transceiver 512 and antenna 522, and/or between transceiver 514 and antenna 524, may include a MAC-PHY interlink containing FEC functionality including offload capability, in some embodiments. In some embodiments, the FEC functionality may be provided in a SFP module providing the interlink.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Figure 6:
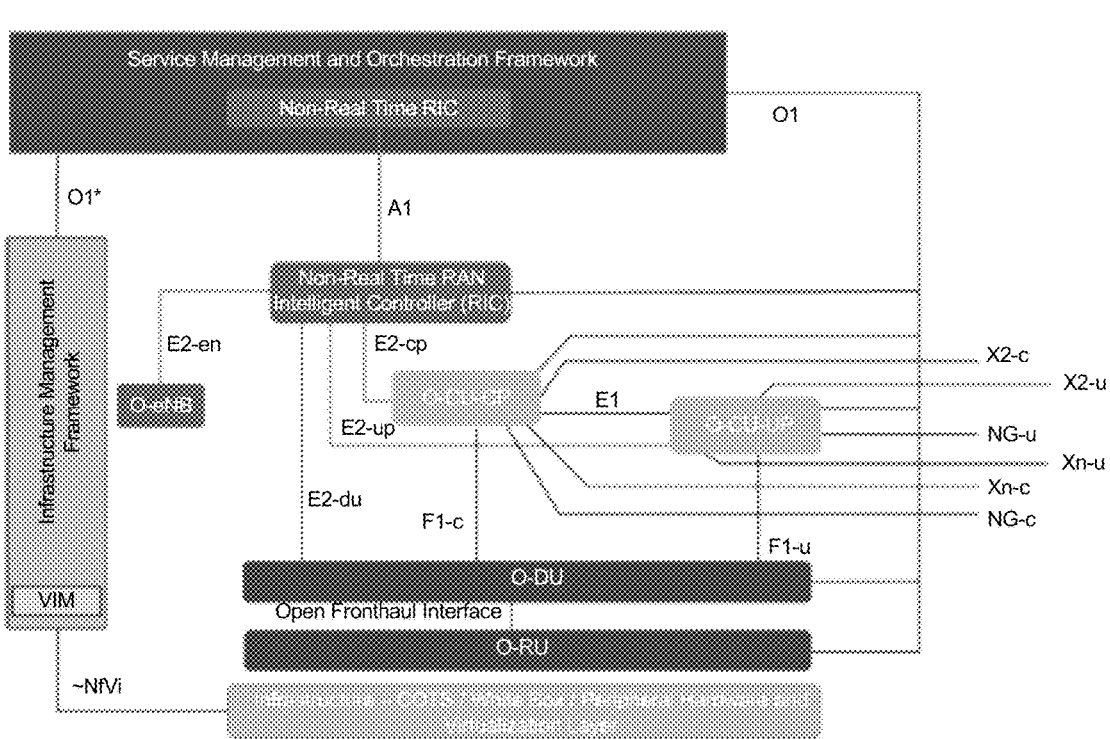
FIG. 6 is a schematic diagram of an Open RAN 4G/5G deployment architecture, in accordance with some embodiments.

FIG. 6 is a schematic diagram of an Open RAN 4G/5G deployment architecture, as known in the prior art. The O-RAN deployment architecture includes an O-DU and O-RU, as described above with respect to FIG. 1 and the other figures described herein, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown).

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the Asserts which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A cellular base station providing cellular network Forward Error Correction (FEC) offload, comprising:
   a FEC functionality within an interface between a physical layer (PHY) and a media access control layer (MAC), the interface having a first side physically connected to the PHY and having a second side physically connected to the MAC, the FEC functionality further configured to perform steps including:

identifying data carrying packets;
   forward error correction encoding of the data payload at the FEC functionality; and
   forwarding an encoded payload to a next layer.

2. The cellular base station of claim 1, wherein the next layer is the PHY.

3. The cellular base station of claim 1, the steps further comprising decoding of a second data payload at the FEC functionality; and forwarding a decoded payload to the MAC.

4. The cellular base station of claim 1, wherein the FEC functionality is provided within a small form factor pluggable (SFP) form factor.

5. The cellular base station of claim 1, the steps further comprising identifying data carrying packets using at least one of: pattern, preamble, header, and protocol match.

6. The cellular base station of claim 1, further comprising a non-data payload to PHY.

7. The cellular base station of claim 1, the steps further comprising encoding the data payload based on a communication system definition.

8. The cellular base station of claim 7, wherein the communication system definition is one of: 3G turbo coding; 4G LTE low density parity check (LDPC); and 5G LDPC.

9. The cellular base station of claim 1, wherein the FEC functionality is implemented as an ASIC or part of an ASIC within the interface between the PHY and MAC.

10. The cellular base station of claim 1, wherein identifying data carrying packets further comprises the FEC functionality independently identifying data payloads based on at least one of: pattern, preamble, header, or predefined protocol.

11. The cellular base station of claim 1, the steps further comprising receiving FEC configurations from a PHY controller, wherein the PHY controller sets the FEC configurations in advance for a next data payload or by using dedicated identification marking of the data payload.

12. The cellular base station of claim 1, the steps further comprising extracting FEC configurations independently by the FEC functionality based on prior knowledge of a link protocol or standard definition.

13. The cellular base station of claim 1, the steps further comprising generating a message to a PHY controller with the encoded data and a header.

14. The cellular base station of claim 1, further comprising encapsulating the encoded data with a same header as provided from the MAC layer.

15. The cellular base station of claim 1, further comprising encapsulating the encoded data using a known protocol with dedicated marking in user defined fields.

16. The cellular base station of claim 1, further comprising bypassing the FEC functionality at the PHY layer when using the FEC functionality within the interface.

17. The cellular base station of claim 1, further comprising a PHY controller selectively bypassing one or more functionalities in the FEC functionality and applying the bypassed functionality on a PHY compute platform.

18. The cellular base station of claim 1, further comprising receiving demodulated data from the PHY encapsulated into a message for the FEC functionality.

19. The cellular base station of claim 1, wherein the message uses at least one of: a proprietary header, a standard header, or user fields in an existing protocol.

20. The cellular base station of claim 1, further comprising receiving decoding configurations from a PHY controller before receiving the data payload or in a same message with the data payload.

21. The cellular base station of claim 1, further comprising storing data for retransmission combining in an internal or external memory associated with the FEC functionality.

22. The cellular base station of claim 1, wherein memory allocated for combining is optimized to fit a retransmission percentage instead of full memory for maximum retransmission for all data payloads.

23. The cellular base station of claim 1, further comprising the PHY holding a copy of the data payload previously forwarded to the FEC functionality and upon CRC check fail, performing retransmission combining on the PHY layer and propagating a combined version of the payload to the FEC functionality.

* * * * *